United States Patent [19]
Tarsy et al.

[11] Patent Number: 5,367,687
[45] Date of Patent: Nov. 22, 1994

[54] METHOD AND APPARATUS FOR OPTIMIZING COST-BASED HEURISTIC INSTRUCTION SCHEDULING

[75] Inventors: Gregory Tarsy, Scotts Valley; Michael J. Woodard, Fremont, both of Calif.

[73] Assignee: Sun Microsystems, Inc., Mountain View, Calif.

[21] Appl. No.: 88,418

[22] Filed: Jul. 7, 1993

Related U.S. Application Data

[63] Continuation of Ser. No. 667,548, Mar. 11, 1991, abandoned.

[51] Int. Cl.$^5$ .............................................. G06F 9/38
[52] U.S. Cl. ............................ 395/700; 364/DIG. 1; 364/231.8; 364/232.3; 364/280.4; 395/500
[58] Field of Search .................... 364/DIG. 1, DIG. 2

[56] References Cited

U.S. PATENT DOCUMENTS

| | | | |
|---|---|---|---|
| 3,611,306 | 10/1971 | Reigel | 395/650 |
| 4,231,106 | 10/1980 | Heap et al. | 364/900 |
| 4,466,061 | 8/1984 | Desantis et al. | 364/200 |
| 4,511,961 | 4/1985 | Penton | 395/775 |
| 4,601,008 | 7/1986 | Kato | 395/550 |
| 4,845,615 | 7/1989 | Blasciak | 395/400 |
| 4,847,755 | 7/1989 | Morrison et al. | 364/200 |
| 4,890,227 | 12/1989 | Watanabe et al. | 395/800 |
| 5,103,394 | 4/1992 | Blasciak | 395/575 |
| 5,127,104 | 6/1992 | Dennis | 395/650 |

OTHER PUBLICATIONS

Warren, Jr., H. S., *Instructions Scheduling For the IBM RISC System/6000 Processor*, IBM Journal of Research and Development, (1990), Jan., No. 1, Armond, N.Y., USA.

H. Kasahara et al., *Parallel Processing of Near Fine Grain Tasks Using Static Scheduling On OSCAR (Optimally Scheduled Advanced Multiprocessor)*, Proceedings of Supercomputing '90, Nov. 12–16, 1990, N.Y., N.Y., IEEE Computer Society Press, Los Alamitos, California.

*Primary Examiner*—Gareth D. Shaw
*Assistant Examiner*—Lucien Toplu
*Attorney, Agent, or Firm*—Blakely Sokoloff Taylor & Zafman

[57] ABSTRACT

A method and apparatus for optimizing cost-based heuristic instruction scheduling for a pipelined processor is disclosed which has particular application to compile time instruction scheduling after code generation. Instruction scheduling is optimized by determining the optimal weights to be used by an apparatus for cost based heuristic instruction scheduling for a particular pipelined processor. The optimal weights are determined based on the lowest of the lowest costs incurred by different collections of interrelated weight sets. Each collection of interrelated weight sets comprises a randomly generated initial weight set and subsequent interrelated weight sets generated in a predetermined manner. The predetermined manner for generating subsequent weight sets facilitates rapid identification of the optimal weight set for a collection, and thereby rapid identification of the overall optimal weight set for the collections.

20 Claims, 19 Drawing Sheets

```
C***********************************************************
C       KERNEL 25      rolled saxpy from linpack
C
C
C       level-1 BLAS simplified
C***********************************************************
        do 2530 L= 1, Loop
        do 2530 k= 1,n
           y(k) = y(k) + Q*x(k)
2530 continue C***********************************************************
C       KERNEL 26      unrolled saxy from linpack
C***********************************************************
        do 2651 L= 1, Loop
2620    m = mod (n,4)
        if ( m .eq. 0 ) go to 2640
        do 2630 i = 1,m
           y (i) = y (i) + Q*x(i)
2630 continue
        if ( n .lt. 4 ) goto 2651
2640 mpl = m + 1
        do 2650 i = mpl,n,4
           y(i) = y(i) + Q*x(i)
           y(i + 1) = y(i + 1) + Q*x(i + 1)
           y(i + 2) = y(i + 2) = Q*x(i = 2)
           y(i = 3) = y(i + 3) + Q*x(i + 3)
2650 continue
2651 continue C***********************************************************
C       KERNEL 27      complex level 1-1 BLAS simplified from
C                      zlinpack
C***********************************************************
        do 2840 L= 1, Loop
        do 2830 i = 1,n
           dy(i) = dy(i) + da*dx(i)
2830 continue
2840 continue
```

*Figure 7a*

```
C***********************************************************
C       KERNEL 28   forms the dot product of two complex vectors.
C***********************************************************
c
c
        do 2940 L= 1,Loop
        da = ZERO
        do 2930 i = 1,n
            da = da + dx(i) *dy(i)
2930 continue C***********************************************************
C       KERNEL 29    level-2 (HLG) BLAS UNROLLED TO A
C                    DEPTH OF 2
C***********************************************************

C    Cleanup odd vector
C
        DO 3140 L= 1,Loop
        J = MOD (N,2)
        IF (J .GE. 1) THEN
            DO 3110 I = 1, N
                B(1,I) = (B(1,I)) + C(1,J) *H(J,I)
3110        CONTINUE
        ENDIF
C
C    Main loop - groups of two vectors
C
        JMIN = J+2
        DO 3130 J = JMIN, N, 2
            DO 3120 I = 1, N
                B(1,I) = ( (B(1,I))
     $               + C(1,J-1) *H(J-1,I)) + C(1,J) *H(J,I)
3120        CONTINUE
3130    CONTINUE
3140    CONTINUE
```

*Figure 7b*

```
C******************************************************
C         KERNEL 30    level-2 (HLG) BLAS UNROLLED TO A
C                      DEPTH OF 4
C******************************************************
C    Cleanup odd vector
C
      DO 3250 L= 1,LOOP
      J = MOD (N,2)
      IF (J .GE. 1) then
         DO 3210 I = 1, N
            B(1,I) = (B(1,I)) + C(1,J) *H(J,I)
3210     CONTINUE
      ENDIF
C
C    Cleanup odd group of two vectors
C
      J = MOD (N,4)
      IF (J .GE. 2) THEN
         DO 3220 I = 1,N
            B(1,I) = ( (B(1,I))
     $               + C(1,J-1) *H(J-1,I)) + C(1,J) *H(J,I)
3220     CONTINUE
      ENDIF
C
C    Main loop - groups of four vectors
C
      JMIN = J+4
      DO 3240 J = JMIN, N, 4
         DO 3230 I = 1,N
            B(1,I) = ((( (B(1,I))
     $               + C(1,J-3) *H(J-3,I)) + C(1,J-2) *H(J-2,I))
     $               + C(1,J-1) *H(J-1,I)) + C(1,J)   *H(J,I)
3230     CONTINUE
3240  CONTINUE
```

*Figure 7c*

```
C***********************************************************
C       KERNEL 31     level-2 (HLG) BLAS UNROLLED TO A
C                     DEPTH OF 8
C***********************************************************
C    Cleanup odd vector
C
        DO 3360 L= 1,Loop
        J = MOD (N,2)
        IF (J .GE. 1) THEN
           DO 3310 I = 1,N
              B(1,I) = (B(1,I)) + C(1,J) *H(J,I)
3310       CONTINUE
        ENDIF
C
C    Cleanup odd group of two vectors
C
        J = MOD (N,4)
        IF (J .GE. 2) THEN
           DO 3320 I = 1, N
              B(1,I) = ( (B(1,I))
     $                 + C(1,J-1) *H(J-1,I)) + C(1,J) *H(J,I)
3320       CONTINUE
        ENDIF
C
C    Cleanup odd group of four vectors
C
        J = MOD(N,8)
        IF (J .GE. 4) THEN
           DO 3330 I = 1, N
              B(1,I) = ((( (B(1,I))
     $                 + C(1,J-3) *H(J-3,I)) + C(1,J-2) *H(J-2,I))
     $                 + C(1,J-1) (*H(J-1,I)) + C(1,J)   *H(J,I)
3330       CONTINUE
        ENDIF
C
C    Main loop - groups of eight vectors
C
        JMIN = J+8
        DO 3350 J = JMIN, N, 8
           DO 3340 I = 1,N
              B(1,I) = ((((((( (B1,I)
     $                 + C(1,J-7) *H(J-7,I)) + C(1,J-6) *H(J-6,I))
     $                 + C(1,J-5) *H(J-5,I)) + C(1,J-4) *H(J-4,I))
     $                 + C(1,J-3) *H(J-3,I)) + C(1,J-2) *H(J-2,I))
     $                 + C(1,J-1) *H(J-1,I)) + C(1,J)   *H(J,I)
3340       CONTINUE
3350    CONTINUE
3360    CONTINUE
```

*Figure 7d*

```
C******************************************************************
C          KERNEL 32    level-2 (HLG) BLAS UNROLLED TO A
C                       DEPTH OF 16
C******************************************************************

C     Cleanup odd vector
C
      DO 3470 L= 1,Loop
      J = MOD(N,2)
      IF (J .GE. 1) THEN
         DO 3410 I = 1, N B(1,I) = (B(1,I)) + C (1,J) *H(J,I)
3410     CONTINUE
      ENDIF
C
C     Cleanup odd group of two vectors
C
      J = MOD (N,4)
      IF (J .GE. 2) THEN
         DO 3420 I + 1, N
            B(1,I) = (  (B1,I))
     $                    + C(1,J-1) *H(J-1,I)) + C(1,J) *H(J,I)
3420     CONTINUE
      ENDIF
C
C     Cleanup odd group of four vectors
C
      J = MOD (N,8)
      IF (J .GE. 4) THEN
         DO 3430 I = 1, N
            B(1,I) = ((( (B(1,I))
     $                    + C(1,J-3) *H(J-3,I)) + C(1,J-2) *H(J-2,I))
     $                    + C(1,J-1) *H(J-1,I)) + C(1,J)   *H(J,I)
3430     CONTINUE
      ENDIF
```

*Figure 7e*

```
C
C      Cleanup odd group of eight vectors
C
       J = MOD (N,16)
       IF (J .GE. 8) THEN
           DO 3440 I = 1, N
               B(1,I) = ((((((( (B(1,I))
     $                   + C(1,J-7) *H(J-7,I)) + C(1,J-6) *H(J-6,I))
     $                   + C(1,J-5) *H(J-5,I)) + C(1,J-4) *H(J-4,I))
     $                   + C(1,J-3) *H(J-3,I)) + C(1,J-2) *H(J-2,I))
     $                   + C(1,J-1) *H(J-1,I)) + C(1,J)   *H(J,I)
3440       CONTINUE
       ENDIF
C
C      Main loop - groups of sixteen vectors
C
       JMIN = J+16
       DO 3460 J = JMIN, N, 16
           DO 3450 I = 1, N
               B(1,I) = ((((((((((((((( (B(1,I))
     $                   + C(1,J-15) *H(J-15,I)) + C(1,J-14) *H(J-14,I))
     $                   + C(1,J-13) *H(J-13,I)) + C(1,J-12) *H(J-12,I))
     $                   + C(1,J-11) *H(J-11,I)) + C(1,J-10) *H(J-10,I))
     $                   + C(1,J- 9) *H(J- 9,I)) + C(1,J- 8) *H(J- 8,I))
     $                   + C(1,J- 7) *H(J- 7,I)) + C(1,J- 6) *H(J- 6,I))
     $                   + C(1,J- 5) *H(J- 5,I)) + C(1,J- 4) *H(J- 4,I))
     $                   + C1,J- 3) *H(J- 3,I)) + C(1,J- 2) *H(J- 2,I))
     $                   + C(1,J- 1) *H(J- 1,I)) + C(1,J)   *H(J,I)
3450       CONTINUE
3460   CONTINUE
3470   CONTINUE C*****************************************************************
C         KERNEL 33      ginsberg highlights - SPELP
C*****************************************************************

DO 355 L=1, Loop
           DO 3510 I=1,N
               Y(I) = U(1) + X(I) * (U(2) + X(I) * (U(4) +

```
C******************************************************************
C        KERNEL 34          ginsberg highlights - SPusual
C******************************************************************
        M = 5
        DO 365 L=1,N
            DO 3610 I=1,N
                y(i) = peval ( u, m, x(i))
3610    CONTINUE
 365    CONTINUE C******************************************************************
C        KERNEL 35          ginsberg highlights - SPILP
C******************************************************************
        M = 5
        DO 375 L=1, Loop
            DO 3710 I=1,N
            p37 = U(6)
                DO 3720 J=M,1,-1
3720                p37 = U(J) + X(I) *p37
            Y(I) = p37
3710    CONTINUE
 375    CONTINUE C******************************************************************
C        KERNEL 36          ginsberg highlights - SPIRLP
C******************************************************************
        M = 5
        DO 385 L=1, Loop
            DO 3810 LL=1, N
3810            BRR (LL,6) = U(6)
            DO 3820 J=1,M
                DO 3820 I=1,N
                    BRR(I,6-J) - U(6-J) + X(I) * BRR(I,6-J+1)
3820        CONTINUE
            DO 3830 LL=1,N
                Y(LL) = BRR(LL,1)
3830        CONTINUE
 385    CONTINUE
```

*Figure 7g*

```
C******************************************************************
C          KERNEL 37        whetstone highlights
C****************************************************************** do 39200 L = 1, Loop
          TW = .499975
          T1 = 0.50025
          T2 = 2.0
C
C         Module 3: Array as parameter
C
                  DO 3950 1=1,N
                  CALL PA (E1)
 3950             CONTINUE
C
C         Module 6: Integer arithmetic
C
          JW = 1
          KW = 2
          LW = 3
C
                  DO 3970 I=1,N
                  JW = JW * (KW-JW * (LW-KW)
                  KW = LW * KW - (LW-JW) * KW
                  LW = (LW - KW) * (KW + JW)
                  E1(LW-1) = JW + KW + LW
                  E1(KW-1) = JW * KW * LW
 3970             CONTINUE
C
C         Module 7: Trigonometric functions
C
          XW = 0.5
          XW = 0.5
C
                  DO 3980 I=1,N
                  XW=TW*ATAN(T2*SIN(XW*COS(XW)/(COS(XW+YW)
                     +COS(XW-YW)-1.0))
                  YW=TW*ATAN(T2*SIN(YW)*COS(YW)/(COS(XW+YW)
                     +COS(XW-YW)-1.0))
 3980             CONTINUE
```

*Figure 7h*

```
C
C      Module 8: Procedure calls
C
       XW = 1.0
       YW = 1.0
       ZW = 1.0
C
              DO 3990 I=1,N
              CALL P3 (XW,ZW)
 3990         CONTINUE
C
C      MODULE 9: Array references
C
       JW = 1
       KW = 2
       LW = 3
       E1(1) = 1.0
       E1(2) = 2.0
       E1(3) = 3.0
C
              DO 39100 I=1,N
              CALL P0
 39100        CONTINUE
C
C      Module 11: Standard functions
C
              DO 39120 I+1,N
              XW = SQRT(EXP(LOG(XW)/T1))
 39120        CONTINUE
 39200 CONTINUE C*******************************************************************
C       KERNEL 38    from doduc
C*******************************************************************
       x(n)+x(1)+.2
       do 4010 L = 1, Lc
              Q = SI(X,Y,(X,I) + X(N))) /2,N,I)
 4010  continue
       Time (38) =Second76()-tt
       Call Test (38)
       Call Eofkrnl
 1000  continue
c
       Return
       End
```

*Figure 7i*

```
       REAL function peval ( a, m, x )
       REAL a(*),x
       integer m,k
       REAL p
       p = a(m+1)
       do 15 k = m,1,-1
       p = p * x + a(k)
15     continue
       peval = p
       return
       end c
c      Function used by kernel 38
c
       REAL FUNCTION SI (XTBL, YTBL,XX,NN,IND)
       REAL XX
       REAL XTBL (NN), YTBL(NN)
       IND = 0
       X = XX
       N = NN
       IF(X-XTBL(1))120,130,150
120    IND = 1
130    II = 2
       GO TO 254
150    IF(XTBL(N)-X)160,180,210
160    IND = 2
180    II = N
       GO TO 254
210    DO 220 IK=2,N
       II = IK
       IF(XTBL(IK)-X) 220,254,254
220    CONTINUE
254    X1 = XTBL(II - 1)
       X2 = XTBL (II)
       Y1 = YTBL (II-1)
       Y2 = YTBL (II)
       SI = Y1 + (Y2-Y1) *(X-X1) / (X2-X1)
       RETURN
       END
```

*Figure 7j*

```
C
C    Subroutines used by kernel 37
C
          SUBROUTINE PA (E)
          IMPLICIT REAL (A-H, O-Z)
          DIMENSION E(4)
          COMMON/WHET/ TW,T1,T2,E1(4),XW,YW,ZW,JW,
             KW,LW,IWW
          J1 = 0
     10   E(1) = (E(1) + E(2) + E(3) - E(4)) *TW
          E(2) = (E(1) + E(2) - E(3) + E(4)) * TW
          E(3) = (E(1) - E(2) + E(3) + E(4)) * TW
          E(4) = (-E(1) + E(2) + E(3) + E(4)) / T2
          J1 = J1 + 1
          IF (J1 - 6) 10,20,20
C
     20   RETURN
          END
C
          SUBROUTINE P0
          IMPLICIT REAL (A-H,O-Z)
          COMMON /WHET/ TW,T1,T2,E1(4),XW,YW,ZW,JW,
             KW,LW,IWW
          X1 = X
          Y1 = Y
          X1 = TW * (X1 + Y1)
          Y1 = TW * (X1 + Y1)
          Z = (X1 + Y1) / T2
          RETURN
          END
```

*Figure 7k*

METHOD AND APPARATUS FOR OPTIMIZING COST-BASED HEURISTIC INSTRUCTION SCHEDULING

This is a continuation of application Ser. No. 07/667,548, filed Mar. 11, 1991, now abandoned.

BACKGROUND OF THE INVENTION

1. Field of the Invention

The present invention is related to the field of computer systems. Specifically, the present invention relates to optimizing cost-based heuristic instruction scheduling for a pipelined processor.

2. Art Background

In the co-pending U.S. patent application Ser. No. 07/661,674, filed on Feb. 27, 1991, invented by the inventors of the present invention, G. Tarsy and M. Woodard, assigned to the assignee of the present Application, Sun Microsystems Inc., entitled *Method and Apparatus for Cost-based Heuristic Instruction Scheduling*, a method and apparatus for cost-based heuristic instruction scheduling for a pipelined processor is disclosed which has particular application to compile time instruction scheduling after code generation.

The method for cost-based heuristic instruction scheduling for a pipelined processor of the co-pending Application comprises the steps of building an instruction dependency graph for a block of instructions to be scheduled, building a free instruction list for the instructions based on the instruction dependency graph, and scheduling one of the free instructions based on the lowest total cost of the free instructions. The total cost for each of the free instructions is computed based on the weighted sum of a plurality of cost heuristics. Additionally, the free instruction list is refreshed after a free instruction is scheduled and another one of the free instructions from the refreshed list is scheduled. The refreshing and scheduling is repeated until the instructions of the instruction block are all scheduled.

The apparatus for cost-based heuristics instruction scheduling for a pipelined processor of the co-pending Application comprises a dependency graph building procedure for building an instruction dependency graph, a list building procedure for building and refreshing a free instruction list, and a scheduling procedure for scheduling one of the free instructions. Additionally, the preferred embodiment of the apparatus of the co-pending Application further comprises a processor model for modeling some of the cost heuristics.

The cost heuristics of the method and apparatus of the co-pending Application comprise a resource dependency cost, a data dependency cost, a dependency wait cost, a dependent cycle cost, a floating point ratio cost, a store ratio cost, and a floating point queue cost. The weights of the cost heuristics represent the relative importance of the cost heuristics for a particular pipelined processor.

The salient characteristics of pipelined processors vary significantly from one processor to the other, for example, single cycle integer load/use penalty and floating point load/use penalty. Empirical evidence has shown that weights customized for a particular pipelined processor substantially improve the effectiveness of the method and apparatus for cost-based heuristic instruction scheduling described in the co-pending Application.

As will be described, the present invention further improves the effectiveness of the method and apparatus of the co-pending Application, and provides a complementary method and apparatus for optimizing cost-based heuristic instruction scheduling for a pipelined processor.

SUMMARY OF THE INVENTION

A method and apparatus for optimizing cost-based heuristic instruction scheduling for a pipelined processor is disclosed which has particular application to compile time instruction scheduling after code generation.

The method of the present invention comprises the steps of providing a collection of interrelated weight sets to an apparatus for cost-based heuristic instruction scheduling, each weight set comprising an ordered n-tuple of weights; providing an identical benchmark for each of the weight sets; accumulating costs incurred for instruction blocks of the benchmark; and evaluating the accumulated costs incurred for the benchmark to determine the lowest accumulated cost and the optimal weight set of the collection.

The method of the present invention further comprises the steps of repeating the above steps to determine a new lowest accumulated cost and a new optimal weight set for a different collection of interrelated weight sets with ordered weights; and evaluating the lowest accumulated costs to determine the lowest of the lowest accumulated costs and the optimal weight set of the collections. The steps of repeating with a different collection and evaluating the lowest accumulated costs are repeated until the lowest of the lowest accumulated costs has remained substantially unchanged over a number of collections.

The apparatus of the present invention comprises a weight generation procedure for generating the different collections of interrelated weight sets with ordered weights, a benchmark generation procedure for generating the corresponding identical benchmarks, a cost accumulation procedure for accumulating the costs incurred for the benchmarks, and a cost evaluation procedure for evaluating the accumulated costs to determine the lowest accumulated cost and the optimal weight set for each collection. The cost evaluation procedure is also for evaluating the lowest accumulated costs to determine the lowest of the lowest accumulation costs and the optimal weight set for all collections.

The weight sets of each collection are provided sequentially, one at a time. The initial weight set of each collection is randomly generated. The subsequent weight set of each collection is systematically generated in a first manner until one of two conditions occurs. Additional subsequent weight sets are systematically generated in a second manner, when the first manner generation is terminated under the first of the two conditions.

The first manner comprises generating the subsequent weight sets by systematically varying the weights of their immediate predecessor weight sets. The systematic varying of weights is performed in ascending order of the weights. The varying of one of the weights comprises systematically adding permutations of a varying offset to the weight being varied. Each permutation of the varying offset is computed by multiplying a sign variable, a size variable, and a magnitude variable together. The sign variable varies from −1 to 1. The size variable varies from 1 over a predetermined finite amount in predetermined arithmetic increments. The magnitude variable varies from 1 over a predetermined finite amount in predetermined geometric increments.

The two terminating conditions for the first manner of weight set generation comprise a first condition that the lowest accumulated cost under the current weight set is lower than the lowest of the lowest accumulated costs of the previous weight sets, and a second condition that all the permutations of the varying offset have been used.

The second manner comprises generating the subsequent weight sets by systematically adding the terminating permutation of the varying offset of the first manner to the weights of their immediate predecessor weight sets at the terminating weight position of the first manner.

NOTATIONS AND NOMENCLATURE

Figure 1:
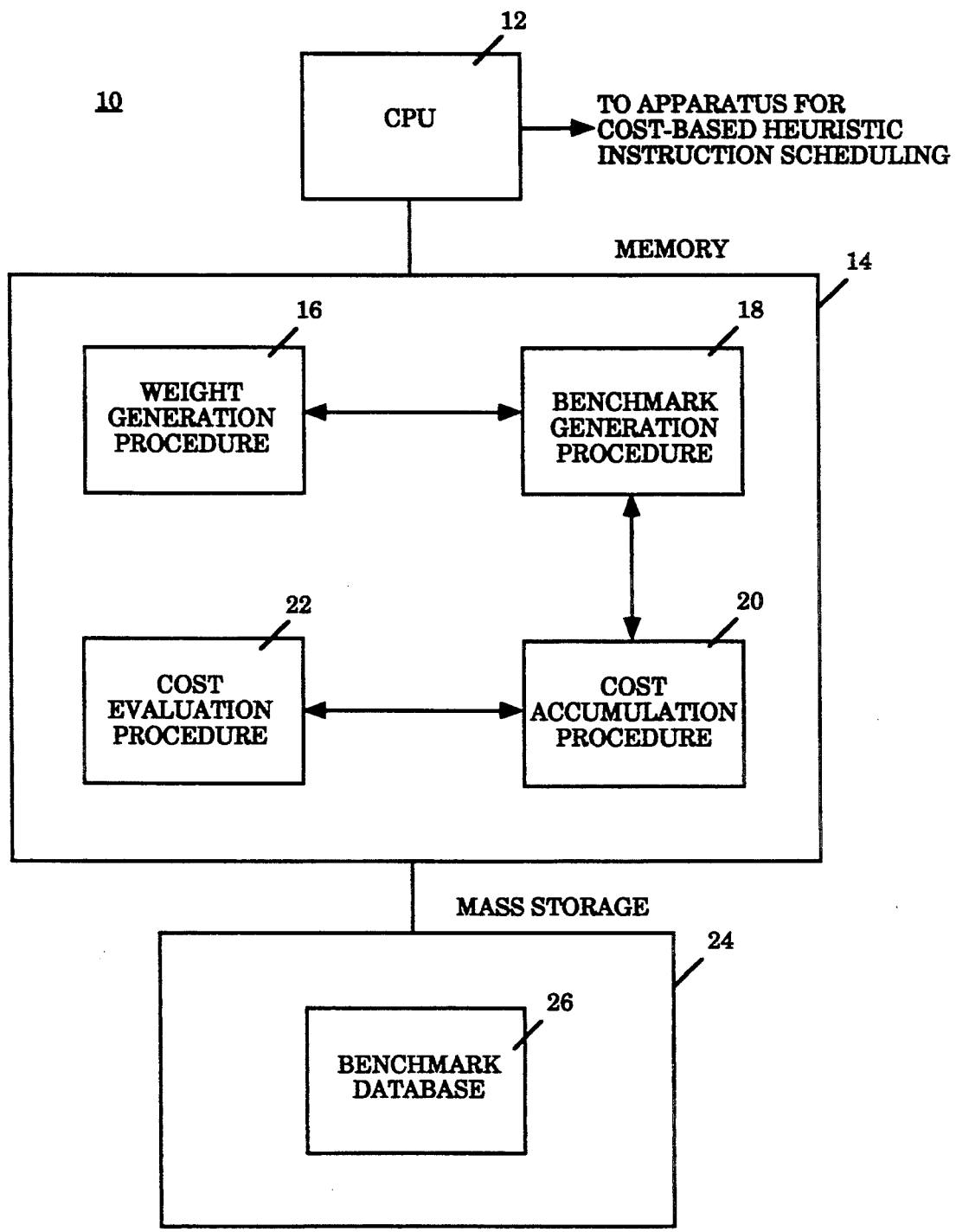
FIG. 1 shows a block diagram illustrating the preferred embodiment of the apparatus of the present invention. The preferred embodiment of the apparatus comprises a weight generation procedure, a benchmark generation procedure, a cost accumulation procedure and a cost evaluation procedure.

The detailed description which follows is presented largely in terms of procedures within a computer memory executed by a central processing unit (CPU). This procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be borne in mind that there is a distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for optimizing cost-based heuristic instruction scheduling for a pipelined processor is disclosed which has particular application to compile time instruction scheduling after code generation. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, a block diagram illustrating the preferred embodiment of the apparatus for optimizing cost-based heuristic instruction scheduling for a pipelined processor is shown. The preferred embodiment of the apparatus of the present invention 10 comprises a central processing unit (CPU) 12, a memory unit 14 comprising a plurality of procedures 16–22 executed by the CPU 12, and a mass storage unit 24 comprising a database 26 accessed by one of the procedures 18.

The CPU 12 is for executing the the procedures 16–18 within the memory 14. The CPU 12 comprises an interface for providing input to the apparatus for cost-based heuristic instruction scheduling described in the copending Application. Additionally, the interface is for accessing tables/files maintained by the apparatus for cost-based heuristic instruction scheduling described in the co-pending Application.

The memory unit 14 is for storing the procedures 16–18 being executed by the CPU 12. The memory unit 14 coupled to the CPU 12 comprises a weight generation procedure 16, a benchmark generation procedure 18 called by the weight generation procedure 16, a cost accumulation procedure 20 called by the benchmark generation procedure 18 and a cost evaluation procedure 22 called by the cost accumulation procedure 20.

The mass storage 24 is for storing an associated database 26 of the executing procedures 16–22. The mass storage 24 comprises a benchmark database 26 accessed by the benchmark generation procedure 18.

Continuing referring to FIG. 1, the weight generation procedure 16 is for generating collections of interrelated weight sets. The interrelated weight sets of each collection is generated sequentially, one at a time. Each collection of the sequentially generated interrelated weight sets comprises an initial weight set and subsequent interrelated weight sets generated in a first manner. Additionally, a collection of the sequentially generated interrelated weight sets furthers comprise of subsequent interrelated weight sets generated in a second manner, when the first manner generation is terminated under a first of two conditions. Each weight set comprises an ordered n-tuple of weights.

Figure 2:
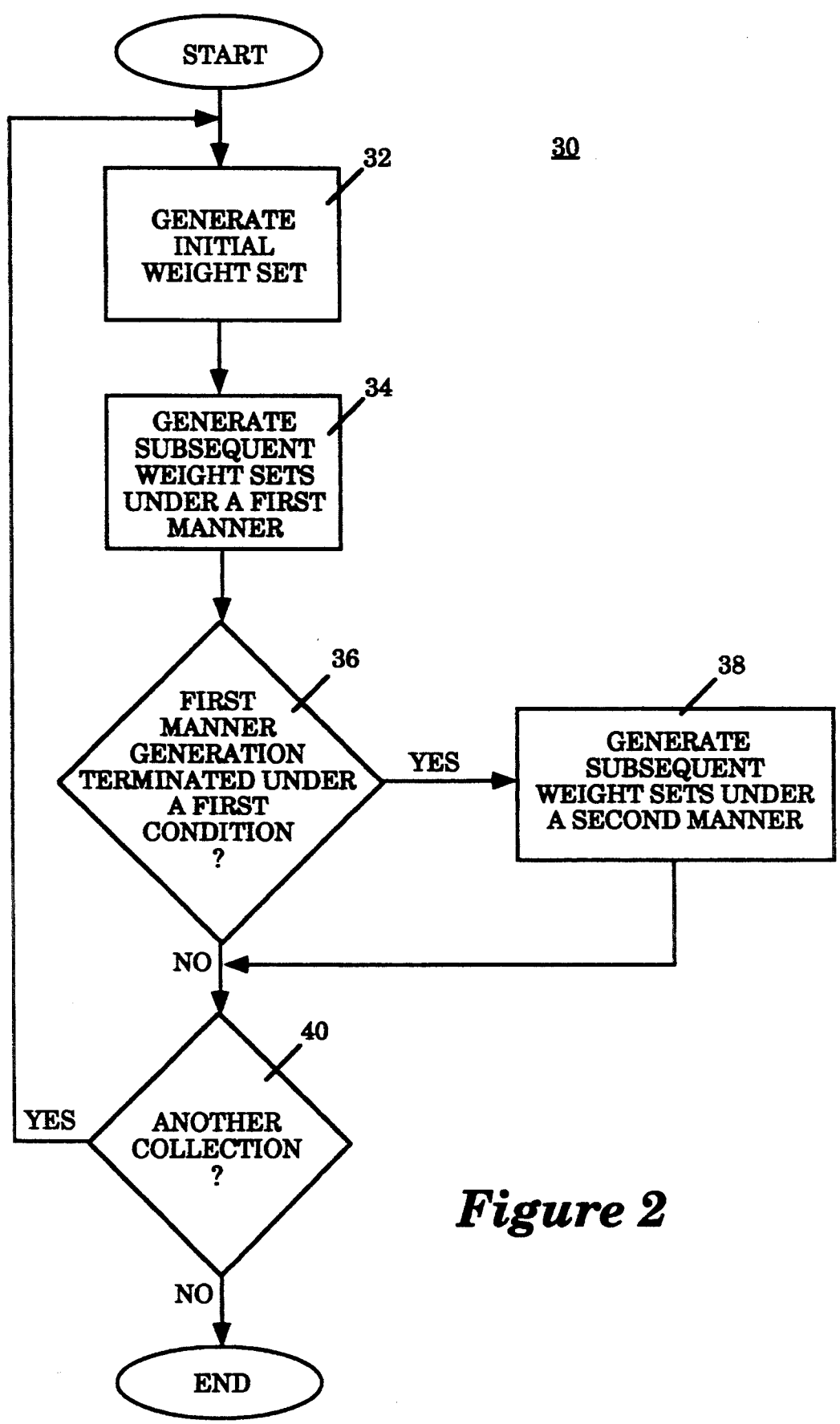
FIG. 2 shows a block diagram illustrating the operational flow overview of the weight generation procedure of the apparatus of the present invention.

Referring now to FIG. 2, a block diagram illustrating the operational flow overview of the weight generation procedure is shown. Initially, the initial weight set is generated 32. Then the subsequent interrelated weight sets are generated under the first manner 34. After the first manner generation is terminated, the condition of termination is determined 36. If the first manner generation is terminated under the first condition, additional subsequent interrelated weight sets are generated under the second manner 38.

If the first manner generation is not terminated under the first condition, or after the second manner generation is terminated, then whether another collection of the interrelated weight sets with ordered weights is to be generated is determined 40. If the result of the determination is negative, the weight generation procedure terminates; otherwise, the weight generation procedure generates another collection 32–38, as previously described.

Figure 3A:
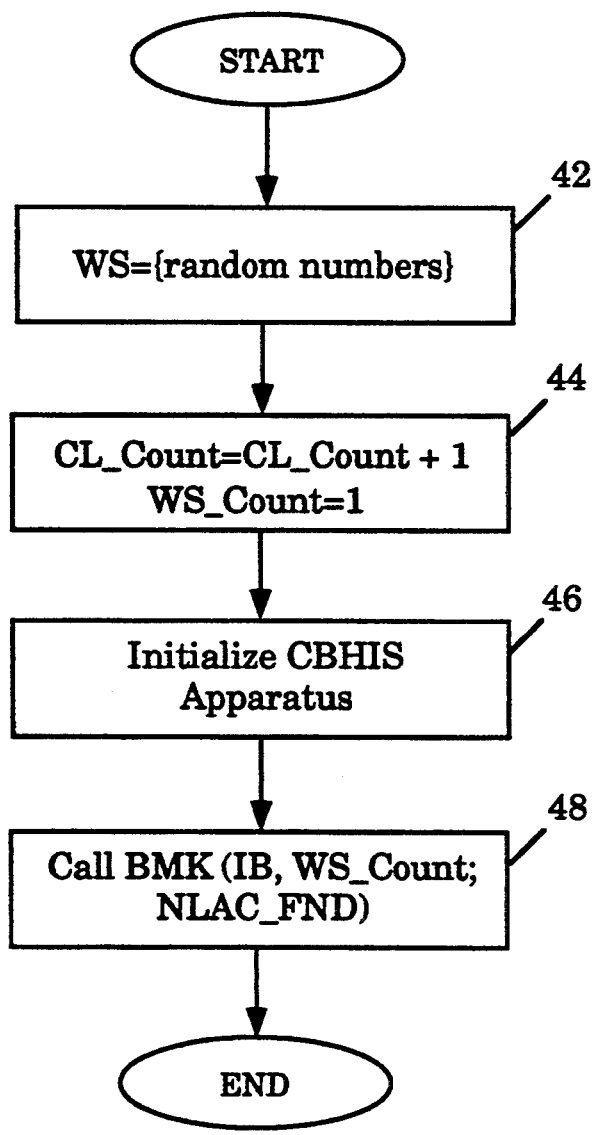
FIG. 3a–3d are block diagrams illustrating the operational flow details of the weight generation procedure of the apparatus of the present invention.

Referring now to FIG. 3a, a block diagram illustrating the generation of the initial weight set of a collection by the weight generation procedure is shown. The ordered n-tuple of weights of the initial weight set of a collection are randomly generated 42. After generating the initial weight set, a collection count (CLCOUNT) is incremented by one, and a weight set count (WSCOUNT) for the collection is initialized to one 44.

Then, the weight table of the apparatus for cost-based heuristic instruction scheduling (CBHIS) described in the co-pending Application is initialized with the generated weight set 46. After initializing the CBHIS apparatus with the initial weight set, the benchmark generation procedure is called to provide the CBHIS apparatus with a benchmark (i.e. function code IB) 48. The current weight set count (WSCOUNT)is also provided along with the call. Upon returning from the benchmark generation procedure, the weight generation procedure proceeds to generate the subsequent interrelated weight sets under the first manner.

A new lowest accumulated cost found indicator (NLACFND) is returned by the benchmark generation procedure upon servicing the call. As will be discussed below, the new lowest accumulated cost found indicator (NLACFND) returned for the initial weight set of a collection always contains the setting of "YES". The usage of the new lowest accumulated cost found indicator (NLACFND) will be discussed in further details later.

Figure 3B:
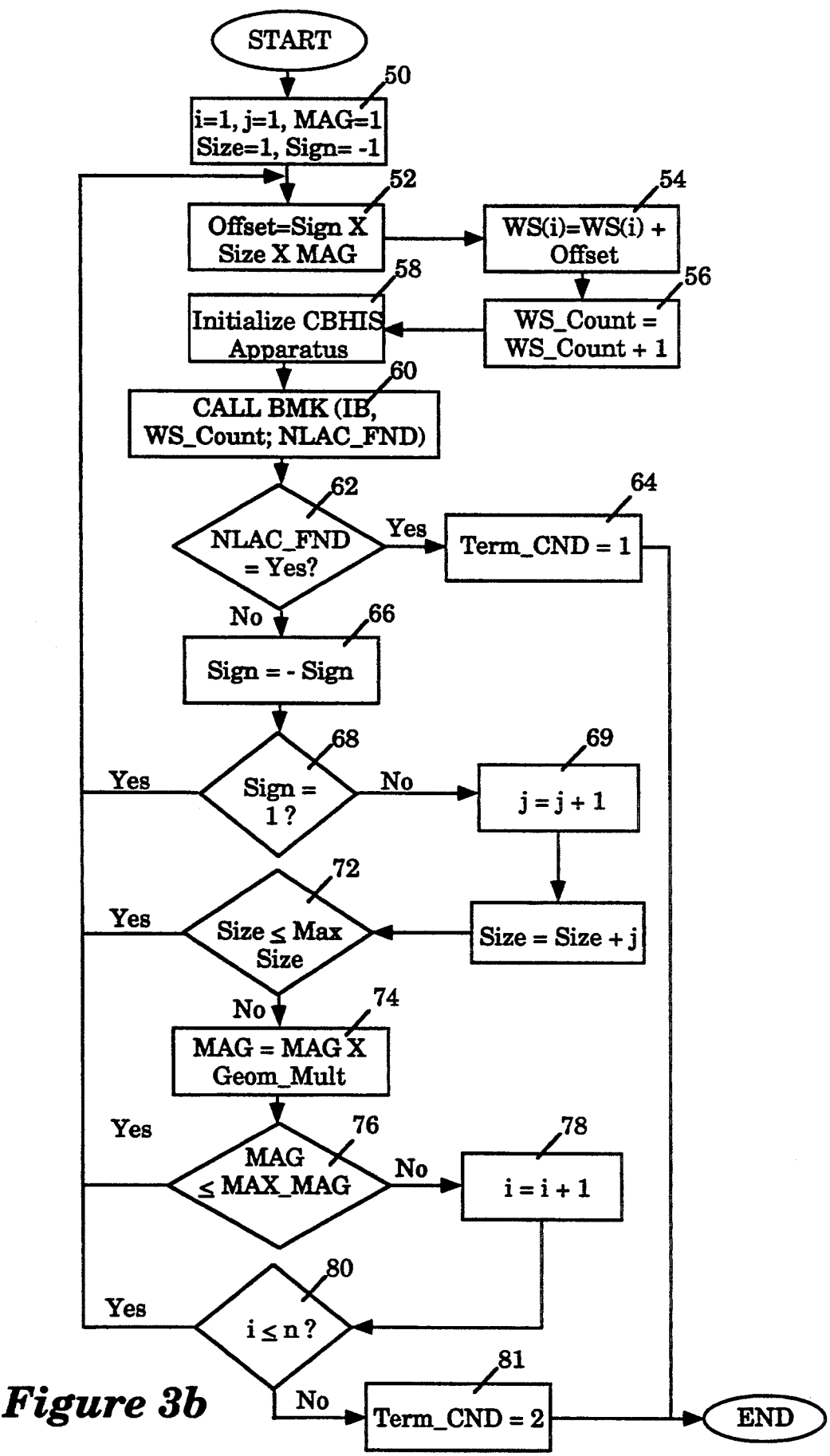

Referring now to FIG. 3b, a block diagram illustrating the generation of the subsequent interrelated weight sets of a collection under the first manner by the weight generation procedure is shown. A weight index (i), a magnitude variable (MAG) and a size variable (SIZE) are all initialized with the value one 50. A sign variable (SIGN) is initialized with the value negative one 50. After initializing the variables, a varying offset is computed by multiplying the variables (SIGN, SIZE and MAG) together. The varying offset is added to the i-th weight of the immediate predecessor weight set to generate a new weight set for the collection.

After generating a new weight set, the weight set count for the collection (WSCOUNT) is incremented 56, the weight table of the CBHIS apparatus is initialized with the newly generated weight set 58, and the benchmark generation procedure is called to provide the CBHIS apparatus with a benchmark 60, as previously described for the initial weight set. Similarly, the new lowest accumulated cost found indicator (NLACFND) is returned by the benchmark generation procedure after servicing the call. The new lowest accumulated cost found indicator (NLACFND) is checked to determine whether a new lowest accumulated cost for the collection is found 62.

If the new lowest accumulated cost found indicator (NLACFND) is "YES", a termination condition indicator (TERMCND) is set to one 64 and the weight set generation under the first manner is terminated. If the new lowest accumulated cost found indicator (NLACFND)is "NO", the sign variable (SIGN) is multiplied by negative one 66. Then, the sign variable (SIGN) is checked to determine if it equals the value one 68.

If the sign variable (SIGN) equals one, the varying offset is re-computed 52, a new weight set is generated 54, the weight set count for the collection is incremented 56, the weight table of the CBHIS apparatus is initialized 58, the benchmark generation procedure is called 60, the returning new lowest accumulated cost found indicator (NLACFND) is checked 62 and the sign variable (SIGN) is re-computed 66 and re-checked 68, as previously described. If the variable (SIGN) does not equal the value one (i.e. equals negative one), a size variable increment index (j) is incremented by one 69. The size variable (SIZE) is re-computed by adding to the size variable (SIZE) the value of j 70. Then the size variable (SIZE) is checked to determine if it exceeds the maximum size (MAXSIZE) 72.

If the re-computed size variable (SIZE) does not exceed the maximum size (MAXSIZE), the varying offset is re-computed 52, a new weight set is generated 54, the weight set count for the collection is incremented 56, the weight table of the CBHIS apparatus is initialized 58, the benchmark generation procedure is called 60, the returning new lowest accumulated cost found indicator is checked 62, the variable SIGN is re-computed 66 and re-checked 68, and the variable (SIZE) is re-computed 70 and re-checked 72 as previously described. If the size variable (SIZE) exceeds the maximum size (MAXSIZE), the magnitude variable (MAG) is re-computed by multiplying the magnitude variable (MAG) by its geometric multiplier (GEOMMULT) 74. Then the magnitude variable MAG is checked to determine if it exceeds the maximum magnitude (MAXMAG) 76.

If the re-computed magnitude variable (MAG) does not exceed the maximum magnitude (MAXMAG), the varying offset is re-computed 52, a new weight set is generated 54, the weight set count for the collection is incremented 56, the weight table of the CBHIS apparatus is initialized 58, the benchmark generation procedure is called 60, the returning new lowest accumulated cost found indicator (NLACFND) is checked 62, the sign variable (SIGN) is re-computed 66 and re-checked 68, the size variable (SIZE) is re-computed 70 and re-checked 72, and the magnitude variable (MAG) is re-computed 74 and re-checked 76, as previously described. If the magnitude variable MAG exceeds the maximum magnitude (MAXMAG), the weight index (i) is incremented by one 78. Then the weight index (i) is checked to determine if it exceeds the maximum index (n) 80.

If the incremented weight index (i) does not exceed the maximum index (n), the varying offset is re-computed 52, a new weight set is generated 54, the weight set count for the collection is incremented 56, the weight table of the CBHIS apparatus is initialized 58, the benchmark generation procedure is called 60, the returning new lowest accumulated cost found indicator (NLACFND) is checked 62, the sign variable (SIGN) is re-computed 66 and re-checked 68, the size variable (SIZE) is re-computed 70 and re-checked 72, the magnitude variable (MAG) is re-computed 74 and re-checked 76, and the weight index (i) is re-incremented 78 and re-checked 80, as previously described. If the weight index (i) exceeds the maximum index (n), the terminating condition indicator (TERMCND) is set to two 82 and the weight set generation under the first manner is terminated.

In the preferred embodiment of the apparatus of the present invention, the maximum size (MAXSIZE) is six. That is, the size variable (SIZE) varies between the values one, three and six. The geometric multiplier for the magnitude variable (MAG) is ten, and the maximum magnitude (MAXMAG) is one thousand. That is, the magnitude variable (MAG) varies between the values one, ten, one hundred and one thousand.

Figure 3C:
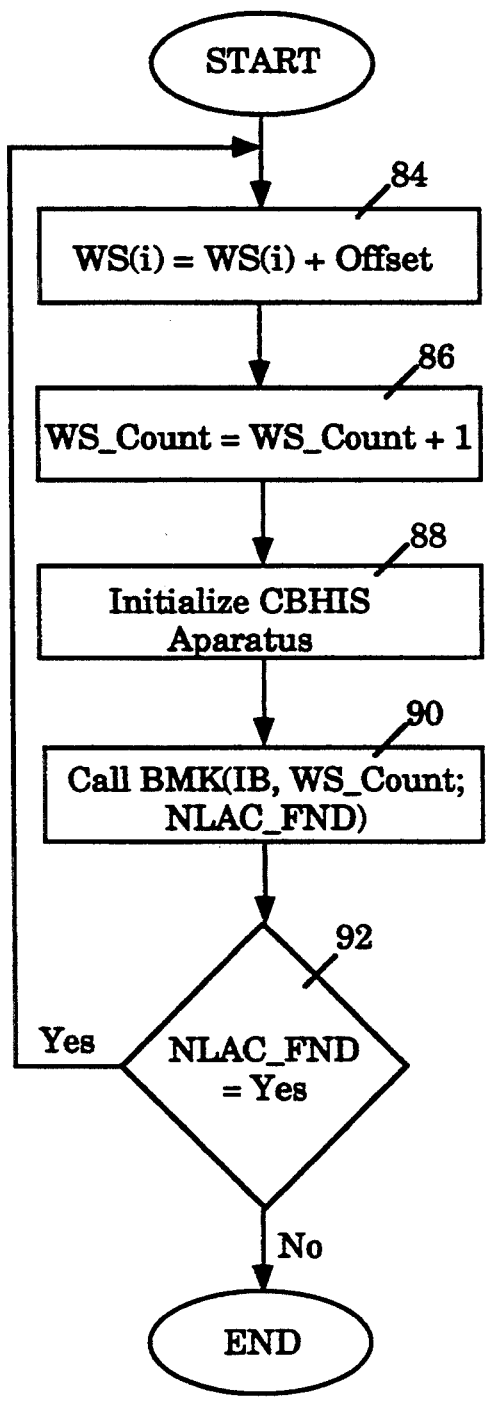

Referring now to FIG. 3c, a block diagram illustrating the generation of subsequent interrelated weight sets of a collection under the second manner by the weight generation procedure is shown. A new weight set is generated by adding the terminating offset of the first manner to the weight of the immediate predecessor weight set located at the terminating weight index 84. After generating a new weight set, the weight set count for the collection (WSCOUNT) is incremented 86, the weight table of the CBHIS apparatus is initialized with the newly generated weight set 88, and the benchmark generation procedure is called to provide the CBHIS apparatus with a benchmark 90, as previously described for the initial weight set and the subsequent weight sets generated under the first manner.

Similarly, the new lowest accumulated cost found indicator (NLACFND) is returned by the benchmark generation procedure, after servicing the call. The new lowest accumulated cost found indicator (NLACFND) is checked to determine whether a new lowest accumulated cost for the collection is found 92. If the new lowest accumulated cost found indicator (NLACFND) is "YES", a new weight set is generated 84, the weight set count for the collection (WSCOUNT) is incremented 86, the weight table of the CBHIS apparatus is initialized 88, and the benchmark generation procedure is called 90, as previously described for the initial weight set and the subsequent weight sets generated under the first manner. Otherwise, weight set generation under the second manner is terminated.

Figure 3D:
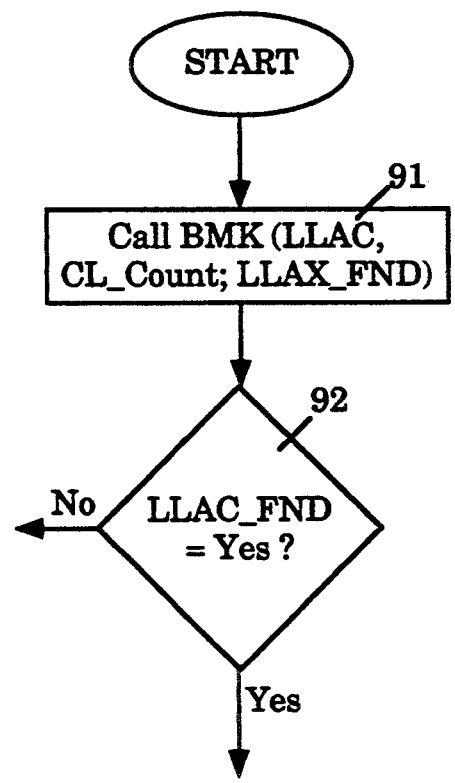

Referring now to FIG. 3d, a block diagram illustrating the determination by the weight generation procedure whether another collection of interrelated weight sets with ordered weights is to be generated is shown. The determination is made by determining whether the lowest of the lowest accumulated costs has remained substantially unchanged over a number of the collections 91-93. The benchmark generation procedure is called to make the determination (i.e. function code LLAC) 91. The current collection count (CLCOUNT) is also provided to the benchmark generation procedure 91 along with the call. The lowest of the lowest accumulated costs found indicator (LLACFND) is returned by the benchmark generation procedure after servicing the call. The lowest of the lowest accumulated costs found indicator (LLACFND) is checked 93, upon returning from the benchmark generation procedure. If the lowest of the lowest accumulated costs found indicator (LLACFND) has a setting of "YES", then the weight generation procedure terminates; otherwise, the weight generation procedure generates another collection as previously described.

Referring back to FIG. 1, the benchmark generation procedure 18 is for generating an identical benchmark for each weight set. The identical benchmark comprise a plurality of kernels. Each kernel comprises at least one instruction block. Preferably, the benchmark is well rounded to represent a wide range of programs executed by the particular pipelined processor. Additionally, the benchmark is also compact and assembles quickly. For example, an exemplary benchmark may comprise a plurality of relatively small performance sensitive kernels and the twenty-four Livermore FORTRAN kernels. Fourteen exemplary relatively small performance sensitive kernels are included in FIGS. 7a-7k. For further description of the Livermore FORTRAN kernels, see MacMahon, F. H., *The Livermore FORTRAN Kernels: A Computer Test of the Numerical Performance Range*, UCRL-53745, Lawrence Livermore National Laboratory, December, 1986.

Figure 4:
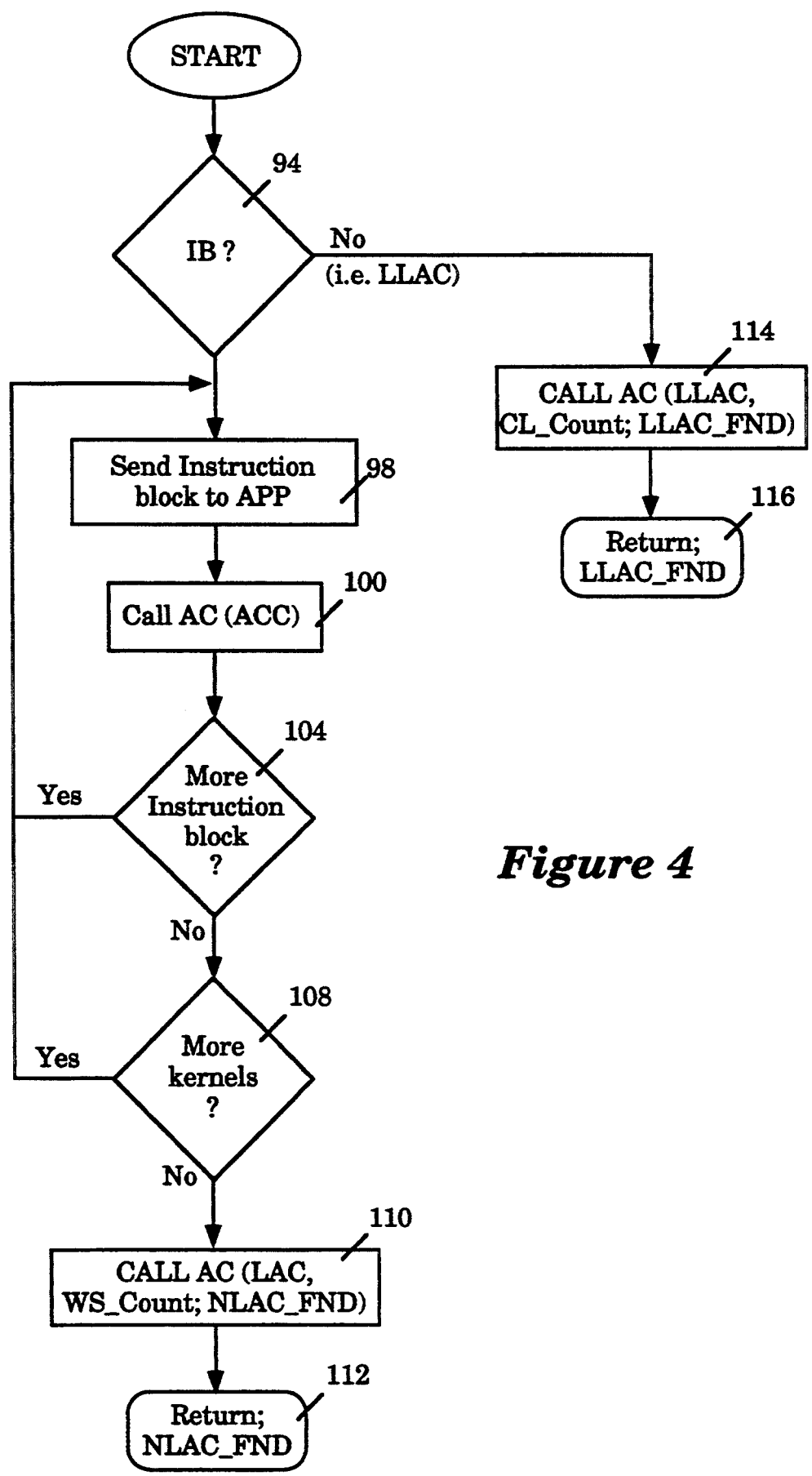
FIG. 4 shows a block diagram illustrating the operation flow of the benchmark generation procedure of the apparatus of the present invention.

Referring now to FIG. 4, a block diagram illustrating the operation flow of the benchmark generation procedure is shown. As previously described, the benchmark generation procedure is called by the weight generation procedure. The benchmark generation procedure receives two types of calls. A first type of call is received when the benchmark generation procedure is called after the weight table of the CBHIS apparatus is initialized with a new weight set. A second type of call is received when the benchmark generation procedure is called after weight set generation for a collection is completed.

Upon receipt of a call, the call type is determined 94. If the call is of the first type (i.e. function code IB), the benchmark database is accessed to retrieve the first instruction block of the first kernel and send to the CBHIS apparatus as input 98. Upon receipt of confirmation from the CBHIS apparatus that the instruction block has been processed, the cost accumulation procedure is called to accumulate the cost computed by the CBHIS apparatus (i.e. function code ACC) 100. Then, the benchmark database is accessed to determine if there are more instruction blocks 104.

If there are more instruction blocks, the next instruction block is sent 98 and the cost accumulation procedure is called again 100 as previously described. If all the instruction blocks of a kernel is sent, the benchmark database is accessed to determine if there are more kernels 108.

If there are more kernels, the sending of instruction blocks 98, the calling of cost accumulation procedure 100, the checking of additional instruction blocks 104 are repeated, until all kernels are handled. After all kernels are handled, the cost accumulation procedure is called to determine if a new lowest accumulated cost for the collection is found (i.e. function code LAC) 110. The current weight set count (WSCOUNT) for the collection is also provided 110. The new lowest accumulated costs found indicator (NLACFND) is returned by the cost accumulation procedure after servicing the call. Upon returning from the cost accumulation procedure, the benchmark generation procedure returns the new lowest accumulated cost found indicator (NLACFND) to its caller, the weight generation procedure 112.

If the call is of the second type (i.e. function code LLAC), the cost accumulation procedure is called to determine if the lowest of the lowest accumulated costs is found 114. The current collection count (CLCOUNT) is also provided 114. The lowest of the lowest accumulated costs found indicator (LLACFND) is returned by the cost accumulation procedure after servicing the call. Upon returning from the cost accumulation procedure, the benchmark generation procedure returns the lowest of the lowest accumulated cost indicator (LLACFND) to its caller, the weight generation procedure 116.

Referring back to FIG. 1, the cost accumulation procedure 20 is for accumulating the cost incurred for each instruction block of the kernels of the benchmark. The costs incurred are computed by the CBHIS apparatus, using the weight set initialized by the weight generation procedure 16. The costs are the weighted sums of a plurality of cost heuristics. The cost heuristics comprise a resource dependency cost, a data dependency cost, a dependency wait cost, a dependent cycle cost, a floating point ratio cost, a store ratio cost, and a floating point queue cost. Additionally, the cost heuristics may be modeled by a processor model. For further description of the cost heuristics, see the copending Application.

Figure 5:
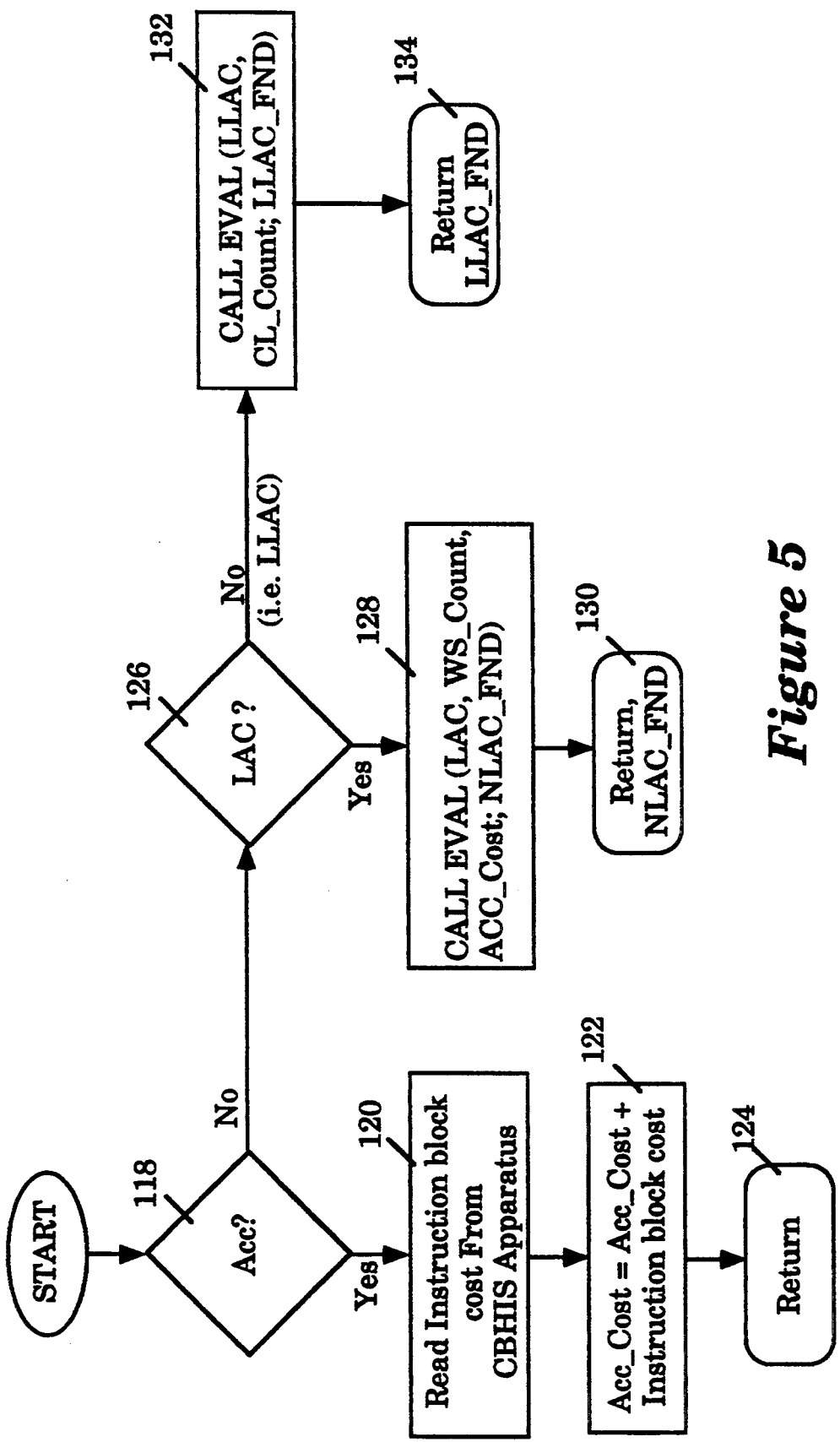
FIG. 5 shows a block diagram illustrating the operation flow of the cost accumulation procedure of the apparatus of the present invention.

Referring now to FIG. 5, a block diagram illustrating the operational flow of the cost accumulation procedure is shown. As previously described, he cost accumulation procedure is called by the benchmark generation procedure. The cost accumulation procedure receives three types of calls. A first type of call is received when the cost accumulation procedure is called after the CBHIS apparatus processed an instruction block. A second type of call is received when the cost accumulation procedure is called after all instruction blocks for a benchmark have been processed. A third type of call is received when the cost accumulation procedure is called after weight set generation for a collection is completed.

Upon receipt of a call, the call type is determined 118, 126. If the call is of the first type (i.e. function code ACC), the cost tables of the CBHIS apparatus is accessed to retrieve the cost incurred for an instruction block 120, and the retrieved cost is accumulated 122. Then, the cost accumulation procedure returns to its caller 124, the benchmark generation procedure. For further description of the cost tables of the CBHIS apparatus, see the co-pending Application.

If the call is of the second call type (i.e. function code LAC), the cost evaluation procedure is called to determine if a new lowest accumulated cost for the collection is found 128. The current weight set count (WSCOUNT) for the collection is also provided along with the call 128. The cost evaluation procedure returns the new lowest accumulated cost found indicator (NLACFND), after servicing the call. Upon returning from the cost evaluation procedure, the cost accumulation procedure returns the new lowest accumulated cost found indicator (NLACFND) to its caller 130, the benchmark generation procedure.

If the call is of the third call type (i.e. function code LLAC), the cost evaluation procedure is called to determine if the lowest of the lowest accumulated cost is found 132. The current collection count (CLCOUNT) is also provided along with the call 132. The cost evaluation procedure returns the lowest of the lowest accumulated cost found indicator (LLACFND), after servicing the call. Upon returning from the cost evaluation procedure, the cost accumulation procedure returns the lowest of the lowest accumulated cost found indicator (LLACFND) to its caller 134, the benchmark generation procedure.

Referring back to FIG. 1, the cost evaluation procedure 22 is for evaluating the accumulated costs to determine the lowest accumulated cost and the optimal weight set of a collection. The cost evaluation procedure 22 is also for evaluating the lowest accumulated costs of the collections to determine if the lowest of the lowest accumulated costs has remained substantially unchanged over a number of collections. A change margin (CHGMGN) is used to determine whether the lowest of the lowest accumulated costs has remained substantially unchanged. The change margin (CHGMGN) may be varied according to the desired accuracy and available computer resources. Likewise, a maximum unchanged count (MAXUNCHG) is used to determine whether the the lowest of the lowest accumulated costs has remained substantially unchanged over sufficient number of collections. The maximum unchanged count (MAXUNCHG) may also be varied according to the desired accuracy and available computer resources.

Figure 6:
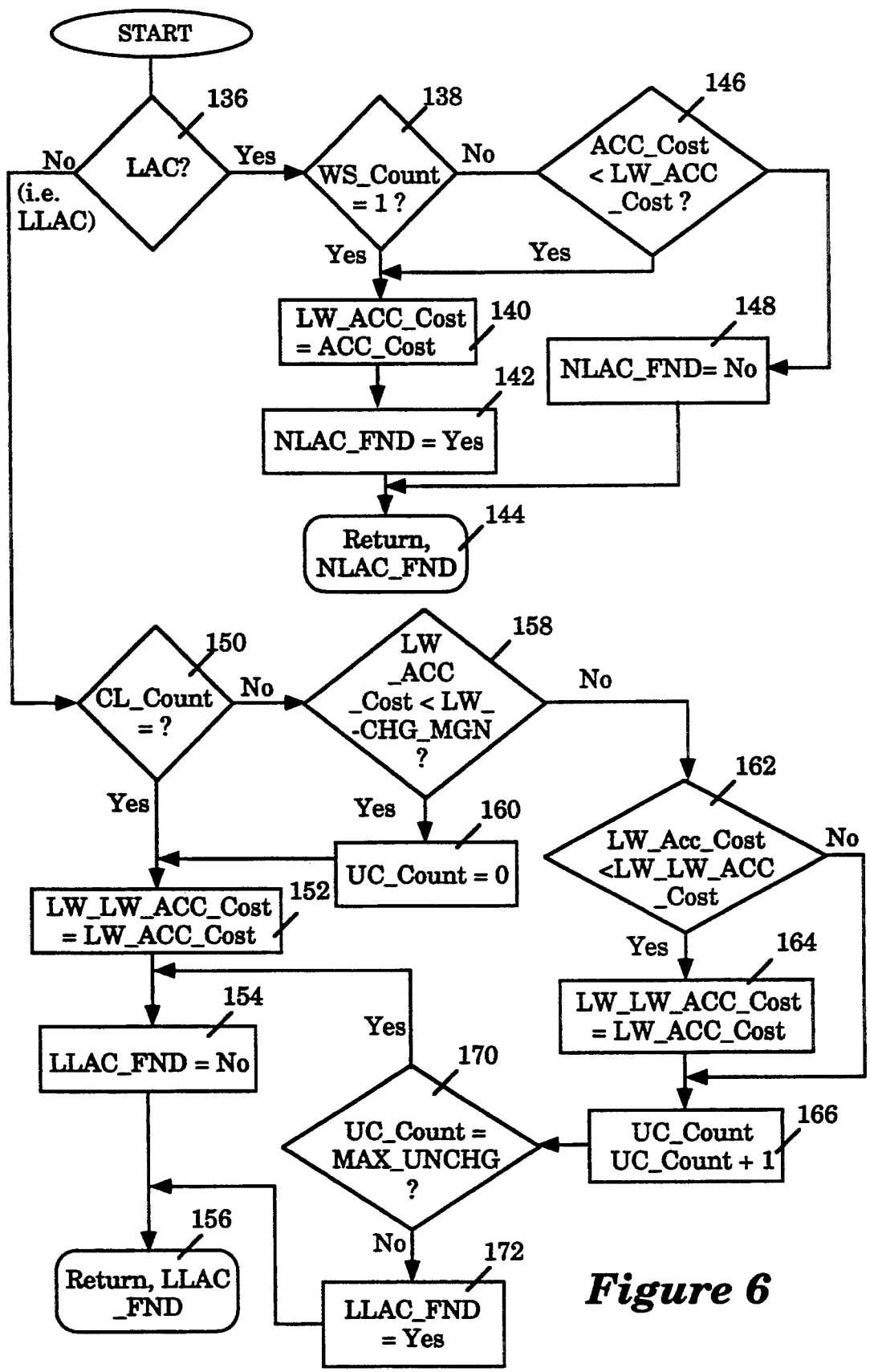
FIG. 6 shows a block diagram illustrating the operation flow of the cost evaluation procedure of the apparatus of the present invention.

Referring now to FIG. 6, a block diagram illustrating the operational flow of the cost evaluation procedure is shown. The cost evaluation procedure is called by the cost accumulation procedure. The cost evaluation procedure receives two types of calls. A first type of call is received when the cost evaluation procedure is called after a benchmark for one of the weight sets of a collection is processed by the CBHIS apparatus. A second type of call is received when the cost evaluation procedure is called after all the benchmarks for a collection are processed by the CBHIS apparatus.

If the call is of the first call type (i.e. function code LAC), then whether the call is the first call of such call type for a collection is determined 138. The determination is made by examining the current weight set count received 138. If the call is the first call of such call type for a collection, the lowest accumulated cost (LWACCCOST) is set to the accumulated cost (ACCCOST) received 140. The new lowest accumulated cost found indicator (NLACFND) is set to "YES" 142 and returned to the cost evaluation procedure's caller 144, the cost accumulation procedure. If the call is not the first call of the call type for the collection, then whether a new lowest accumulated cost is found is determined 146.

If a new lowest accumulated cost is found, the lowest accumulated cost (LWACCCOST) is set to the accumulated cost (ACCCOST) received 140. The new lowest accumulated cost found indicator (NLACFND) is set to "YES" 142, as previously described. If a new lowest accumulated cost is not found, then the new lowest accumulated cost found indicator (NLACFND) is set to "NO" 148. Either case, the new lowest accumulated cost found indicator (NLACFND) is returned to the cost evaluation procedure's caller 144, the cost accumulation procedure.

If the call is of the second call type (i.e. function code LLAC), then whether the call is the first call of the call type is determined 150. The determination is made by examining the current collection count (CLCOUNT) received 150. If the call is the first call, the lowest of the lowest accumulated costs (LWLWACCCOST) is set to the lowest accumulated cost (LWACCCOST) received 152. The lowest of the lowest accumulated costs found indicator (LLACFND) is set to "NO" 154 and returned to the cost evaluation procedure's caller 156, the cost accumulation procedure. If the call is not the first call of such call type, then whether a new lowest of the lowest accumulated costs is found is determined 158.

The determination whether a new lowest of the lowest accumulated costs is found is made by evaluating whether the lowest accumulated cost (LWACCCOST) received is substantially lower then the current lowest of the lowest accumulated costs (LWLWACCCOST), that is, by at least a predetermined change margin (CHGMGN). If a new lowest of the lowest accumulated costs is found, the unchanged count (UCCOUNT) is reset to zero 160. The lowest of the lowest accumulated costs (LWLWACCCOST) is updated 152, and the lowest accumulated cost found indicator (LLACFND) is set 154 and returned 156, as previously described. If a new lowest of the lowest accumulated costs is not found, then whether the lowest accumulated cost (LWACCCOST) received is at least lower than the current lowest of the lowest accumulated cost (LWLWACCCOST) is determined 162.

If the lowest accumulated cost (LWACCCOST) received is at least lower than the current lowest of the lowest accumulated costs (LWLWACCCOST), then the lowest of the lowest accumulated costs (LWLWACCCOST) is updated 164, as previously described. Whether the lowest accumulated cost (LWACCCOST) received is at least lower than the current lowest of the lowest accumulated costs (LWLWACCCOST) or not, the unchanged count (UCCOUNT) is incremented 166 and checked to determine if the lowest of the lowest accumulated costs has remained unchanged for a sufficient number of collections 170.

The determination whether the lowest of the lowest accumulated costs has remained unchanged for a sufficient number of collections is made by evaluating the unchanged count (UCCOUNT) against the maximum unchanged count (MAXUNCHG) 170. If the lowest of the lowest accumulated costs has remained unchanged for the sufficient number of collections, the lowest of the lowest accumulated costs found indicator is set to "YES" 172, otherwise, it is set to "NO" 154. Either case, the lowest of the lowest accumulated cost found indicator (LLACFND) is returned to the cost evaluation procedure's caller 156, the cost accumulation procedure.

While the invention has been described in terms of a preferred embodiment, those skilled in the art will recognize that the present invention is not limited to the manners for generating weight sets described. The present invention is also not limited to the hardware configuration described. The apparatus of the present invention can be practiced with modification and alteration within the spirit and scope of the appended claims.

What is claimed is:

1. In a computer system comprising a pipelined processor for executing instructions of programs in a parallel and overlapping manner, and a compiler for compiling and generating said instructions, wherein said compiler has a scheduler for scheduling said instructions for execution on said pipelined processor, and said scheduler schedules said instructions using N weighted cost based heuristics, a method for empirically selecting a set of N weights for said scheduler to weigh said N cost based heuristics, said method comprising the steps of:

a) generating arbitrarily an initial trial set of N weights, initializing said scheduler with said arbitrarily generated initial trial set of N weights, generating a plurality of benchmark programs, compiling said benchmark programs using said compiler, accumulating scheduling costs determined by said scheduler for said benchmark programs, initializing a lowest accumulated scheduling cost of said benchmark programs to said accumulated scheduling cost, and selecting said initial trial set of N weights as the selected set of N weights for said scheduler;

b) generating sequentially a first plurality of additional trial sets of N weights in a first manner, one trial set of N weights at a time, each of said first plurality of additional trial sets of N weights being generated by systematically varying the immediately preceding trial set of N weights along an orthogonal dimension of a weight space formed by the N weights, one orthogonal dimension at a time, reinitializing said scheduler with each of said additional trial sets of N weights after each of their generations, regenerating said plurality of benchmark programs after each of said reinitializations, recompiling said regenerated benchmark programs using said compiler after each of said regenerations, reaccumulating scheduling costs determined by said scheduler for said benchmark programs during each of said recompilations, comparing each of said reaccumulated scheduling cost with said lowest accumulated scheduling cost to determine whether a new lowest accumulated scheduling cost is found after each of said reaccumulations, terminating said generation of additional trial sets of N weights in said first manner as soon as a new lowest accumulated scheduling cost is found, updating said lowest accumulated scheduling cost to equal the newly found lowest accumulated scheduling cost if a new lowest accumulated scheduling cost is found, and selecting the trial set of N weights that yields the new lowest accumulated scheduling cost over the previously selected set of N weights as the selected set of N weights for said scheduler if a new lowest accumulated scheduling cost is found; and c) generating sequentially a second plurality of additional trial sets of N weights in a second manner, one additional trial set of N weights at a time, each of said additional trial sets of N weights being generated under said second manner by systematically varying the immediately preceding trial set of N weights along the last orthogonal dimension with the last systematic variation made under said first manner, reinitializing said scheduler with each of said additional trial sets of N weights after each of their generations, regenerating said plurality of benchmark programs after each of said reinitializations, recompiling said regenerated benchmark programs using said compiler after each of said regenerations, reaccumulating scheduling costs determined by said scheduler for said benchmark programs during each of said recompilations, comparing each of said reaccumulated scheduling cost with said lowest accumulated scheduling cost to determine whether a new lowest accumulated scheduling cost is found after each of said reaccumulations, terminating said generation of additional trial sets in said second manner as soon as no new lowest accumulated scheduling cost is found, updating said lowest accumulated scheduling cost to equal the last newly determined lowest accumulated scheduling cost if at least one newly determined lowest accumulated scheduling cost is found, and selecting the last trial set of N weights that yields the last new lowest accumulated scheduling cost over the previously selected set of N weights as the selected set of N weights for said scheduler if at least one newly determined lowest accumulated scheduling cost is found.

2. The method as set forth in claim 1, wherein,
said first manner of generating said first plurality of additional trial set of N weights in said step b) has a predetermined finite number of variations:
said step b) is also terminated when all of said predetermined finite number of variations for generating additional trial sets of N weights under said first manner have been made; and
said step c) is not performed when said step b) is terminated under said all variations have been made condition.

3. The method as set forth in claim 1, wherein, said method further comprises the steps of:
d) initializing a lowest of the lowest accumulated scheduling cost to equal the lowest accumulated scheduling cost and selecting the selected set of N weights as an initial ultimate selected set of N weights after performing said steps a) through c) once;
e) repeating said steps a) through c) a plurality of times, one repetition at a time, comparing the new lowest accumulated scheduling cost to said lowest of the lowest scheduling cost to determine whether a new lowest of the lowest accumulated scheduling cost is found after each of said repetitions of said steps a) through c), updating said new lowest of the lowest accumulated scheduling cost with the new lowest of the lowest accumulated scheduling cost after each of said repetitions if a new lowest of the lowest accumulated scheduling cost is found, selecting the selected set of N weights that yields the new lowest of the lowest accumulated scheduling cost at the end of each of said repetitions over the previous ultimate selected set of N weights as the ultimate selected set of N weights for said scheduler if a new lowest of the lowest accumulated scheduling cost is found, and terminating said repetition of said steps a) through c) when no new lowest of the lowest accumulated scheduling cost is found for a predetermined number of consecutive repetitions.

4. The method as set forth in claim 1, wherein said initial trial set of N weights comprises N randomly generated weights.

5. The method as set forth in claim 2, wherein said systematic varying of the immediately preceding trial set of N weights along an orthogonal dimension of a weight space formed by said weights, one orthogonal dimension at a time, comprises varying the weights of the immediately preceding trial set of N weights, one weight at a time, each weight being varied at least one time in a predetermined manner.

6. The method as set forth in claim 5, wherein each of said weight variations under said first manner of trial weight generation is performed by adding a variation value to the weight being varied.

7. The method as set forth in claim 6, wherein each of said variation values under said first manner of trial weight generation is computed by multiplying a current value of a first variable, a current value of a second variable and a current value of a third variable,
said first variable being varied from $-1$ to $1$,
said second variable being varied incrementally in a predetermined manner from a first initial value over a first finite amount in increasing arithmetic increments, and
said third variable being varied incrementally in a predetermined manner from a second initial value over a second finite amount in fixed geometric increments.

8. The method as set forth in claim 7, wherein said first variable is varied from 1 to 6 in increasing arithmetic increments of 2 and 3.

9. The method as set forth in claim 7, wherein said third variable is varied from 1 to 1000 in fixed geometric increments of 10s.

10. The method as set forth in claim 6 wherein said systematic varying of the immediately preceding trial set of N weights along the last orthogonal dimension with the last systematic variation made under said first manner comprises repeatedly adding the last variation value of said first manner to the last weight varied in said first manner of each immediately preceding trial set of N weights.

11. In a computer system comprising a pipelined processor for executing instructions of programs in a parallel and overlapping manner, and a compiler for compiling and generating said instructions, wherein said compiler has a scheduler for scheduling said instructions for execution on said pipelined processor, and said scheduler schedules said instructions using N weighted cost based heuristics, an apparatus for empirically selecting a set of N weights for said scheduler to weigh said N cost based heuristics, said apparatus comprising:
a) first trial weight generation means for generating arbitrarily an initial trial set of N weights;
(b) second trial weight generation means coupled to said first trial weight generation means for generating sequentially a first plurality of additional trial sets of N weights by systematically varying the immediately preceding trial set of N weights in a first manner, one trial set of N weights at a time, each of said first plurality of additional trial sets of N weights being generated by systematically varying the immediately preceding trial set of N weights along an orthogonal dimension of a weight space formed by the N weights, one orthogonal dimension at a time;
(c) third trial weight generation means coupled to said second trial weight generation means for generating sequentially a second plurality of additional trial sets of N weights by systematically varying the immediately preceding trial set of N weights in a second manner, each of said second plurality of additional trial sets of N weights being generated by systematic varying the immediately preceding trial set of N weights along the last orthogonal dimension with the last systematic variation made under said first manner;

d) initialization means coupled to said first, second, and third trial weight generation means and said scheduler for initializing said scheduler with said arbitrarily generated initial trial set of N weights after its generation, and reinitializing said scheduler with each of said first and second plurality of additional trial sets of N weights generated under said first and second manners after each of their generations;

e) benchmark generation means coupled to said initialization means and said compiler for generating an identical collection of benchmark programs for compilation by said compiler after said initialization, and each of said reinitializations of said scheduler;

f) cost accumulation means coupled to said compiler for accumulating scheduling costs determined by said scheduler for said benchmark programs during each of said compilations of said collection of benchmark programs;

g) first update means coupled to said first, second, and third trial weight generation means, and cost accumulation means for initially updating a lowest accumulated scheduling cost to equal the accumulated scheduling cost of said benchmark programs after the compilation in response to said initial trial set of N weights, updating said lowest accumulated scheduling cost to equal a newly found lowest accumulated scheduling cost if a new lowest accumulated scheduling cost is found through the compilations in response to said first plurality of additional trial set of N weights, and updating said lowest accumulated scheduling cost with the last newly found lowest accumulated scheduling cost if at least one new lowest accumulated scheduling cost is found through the compilations in response to said second plurality of additional trial set of N weights;

h) first comparison means coupled to said accumulation means and said first update means for comparing the accumulated scheduling cost of said benchmark programs with said lowest accumulated scheduling cost to determine if a new lowest accumulated scheduling cost is found after each of said compilations in response to said first plurality of additional trial set of N weights, and comparing the accumulated scheduling cost of said benchmark programs with said lowest accumulated scheduling cost to determine if no new lowest accumulated scheduling cost is found after each of said compilations in response to said second plurality of additional trial set of N weights:

i) first termination means coupled to said second and third trial weight generation means and said first comparison means for terminating said generation of said trial sets of N weights under said first manner by said second trial weight generation means as soon as a new lowest accumulated scheduling cost is found, and terminating said generation of said trial sets of N weights under said second manner by said third trial weight generation means as soon as no new lowest accumulated scheduling cost is found: and j) first selection means coupled to said first, second, and third trial weight generation means, and said first comparison means for selecting said initial trial set of N weights as the selected set of N weights, selecting the trial set of N weights yielding a new lowest accumulated scheduling cost over the previously selected set of N weights as the selected set of N weights while said trial sets of N weights are generated under said first manner, and selecting the last trial set of N weights yield a new lowest accumulated scheduling cost over the previously selected set of N weights as the selected set of N weights while said trial sets of N weights are generated under said second manner.

12. The apparatus as set forth in claim 11, wherein, said second trial weight generation means has a predetermined finite number of variations for generating said trial sets of N weights under said first manner;

said termination means also terminates said generation of said first plurality of additional trial sets of N weights under said first manner by said second trial weight generation means when said second trial weight generation means has made all of said predetermined finite number of variations.

13. The apparatus as set forth in claim 11, wherein, said apparatus further comprises:

k) repetition means coupled to said first, second, and third trial weight generation means, said initialization means, said benchmark generation means, said cost accumulation means, said first update means, said first comparison means, said first termination means, and said first selection means for repeating a plurality of times, one repetition at a time, said functions performed by said first, second, and third trial weight generation means, said initialization means, said benchmark generation means, said cost accumulation means, said first update means, said first comparison means, said first termination means, and said first selection means;

l) second update means coupled to said repetition means and said first update means for updating a lowest of the lowest accumulated scheduling cost to equal said lowest accumulated scheduling cost after said functions of said first, second, and third trial weight generation means, said initialization means, said benchmark generation means, said cost accumulation means, said first update means, said first comparison means, said first termination means, and said first selection means are performed once, and updating said lowest of the lowest accumulated scheduling cost to equal said lowest accumulated scheduling cost after each of said repetitions if a new lowest of the lowest accumulated scheduling cost is found;

m) second comparison means coupled to said repetition means and said first and second update means for comparing said lowest accumulated scheduling cost with said lowest of the lowest accumulated scheduling cost to determine if a new lowest of the lowest accumulated scheduling cost is found after each of said repetitions;

n) second selection means coupled to said repetition means and said first selection means for selecting the selected set of N weights as an initial ultimate selected set of N weights after said functions of said first, second, and third trial weight generation means, said initialization means, said benchmark generation means, said cost accumulation means, said first update means, said first comparison means, said first termination means, and said first selection means are performed once, and selecting the selected set of N weights over the previous ultimate selected set of N weights as the ultimate selected set of N weights after each of said repetitions if a new lowest of the lowest accumulated scheduling cost is found; and o) second termination means coupled to said repetition means and said second comparison means for terminating said repetitions if no new lowest of the lowest accumulated scheduling cost is found for a predetermined number of consecutive repetitions.

14. The apparatus as set forth in claim 11, wherein said initial trial set of N weights comprises N randomly generated weights.

15. The apparatus as set forth in claim 12, wherein said second trial weight generation means systematically varies the immediately preceding trial set of N weights along an orthogonal dimension of a weight space formed by said weights, one orthogonal dimension at a time, by varying the weights of the immediately preceding trial set of N weights, one weight at a time, each weight being varied at least one time in a predetermined manner.

16. The apparatus as set forth in claim 15, wherein said second trial weight generation means varies each weight by adding a variation value to the weight being varied.

17. The apparatus as set forth in claim 16, wherein said second trial weight generation means computes each of said variation values by multiplying a current value of a first variable, a current value of a second variable and a current value of a third variable, said second trial weight generation means varies said first variable from −1 to 1, said second trial weight generation means varies said second variable incrementally in a predetermined manner from a first initial value over a first finite amount in increasing arithmetic increments, and said second trial weight generation means varies said third variable incrementally in a predetermined manner from a second initial value over a second finite amount in fixed geometric increments.

18. The apparatus as set forth in claim 17, wherein said second generation means varies said first variable from 1 to 6 in increasing arithmetic increments of 2 and 3.

19. The apparatus as set forth in claim 17, wherein said second generation means varies said second variable from 1 to 1000 in fixed geometric increments of 10s.

20. The apparatus as set forth in claim 16 wherein said third generation means varies the immediately preceding trial set of N weights along the last orthogonal dimension with the last systematic variation made under said first manner by repeatedly adding the last variation value of said first manner to the last weight varied in said first manner of each immediately preceding trial set of N weights.

* * * * *